US 7,376,066 B2

(12) United States Patent
Sakagami (10) Patent No.: US 7,376,066 B2
(45) Date of Patent: May 20, 2008

(54) INFORMATION RECORDING METHOD AND AN INFORMATION RECORDING APPARATUS

(75) Inventor: Koubun Sakagami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 613 days.

(21) Appl. No.: 11/079,208

(22) Filed: Mar. 15, 2005

(65) Prior Publication Data

US 2005/0213463 A1   Sep. 29, 2005

(30) Foreign Application Priority Data

Mar. 16, 2004   (JP)   ............................. 2004-074107

(51) Int. Cl.
*G11B 20/10* (2006.01)
*G06F 11/00* (2006.01)

(52) U.S. Cl. ................. 369/59.25; 714/701; 369/59.26

(58) Field of Classification Search ............. 369/59.25, 369/59.26, 59.21, 53.35; 714/70, 6, 769
See application file for complete search history.

(56) References Cited

U.S. PATENT DOCUMENTS

| 5,140,322 | A |   | 8/1992 | Sakagami |
| 5,142,380 | A |   | 8/1992 | Sakagami et al. |
| 5,192,949 | A | * | 3/1993 | Suzuki et al. ............... 714/755 |
| 5,497,194 | A |   | 3/1996 | Sakagami et al. |
| 5,546,409 | A | * | 8/1996 | Karasawa .................... 714/755 |
| 5,828,640 | A | * | 10/1998 | Kobayashi ............... 369/59.23 |
| 6,167,551 | A | * | 12/2000 | Nguyen et al. ............. 714/770 |
| 6,772,386 | B2 | * | 8/2004 | Iwata et al. ................ 714/755 |
| 6,865,146 | B2 | * | 3/2005 | Kojima ..................... 369/275.4 |
| 6,888,479 | B2 |   | 5/2005 | Sakagami et al. |
| 2003/0112667 | A1 |   | 6/2003 | Shimizu et al. |
| 2003/0169666 | A1 |   | 9/2003 | Sakagami |
| 2004/0009371 | A1 |   | 1/2004 | Sakagami et al. |
| 2004/0085878 | A1 |   | 5/2004 | Sakagami et al. |
| 2004/0100883 | A1 |   | 5/2004 | Sakagami |
| 2005/0207306 | A1 | * | 9/2005 | Umeda et al. ........... 369/59.11 |
| 2005/0268180 | A1 | * | 12/2005 | Sakagami .................... 714/701 |

FOREIGN PATENT DOCUMENTS

| JP | 07-272411 | 10/1995 |
| JP | 08-212711 | 8/1996 |
| JP | 2001-67813 | 3/2001 |
| JP | 2001-351318 | 12/2001 |
| JP | 2003-123407 | 4/2003 |
| JP | 2004-005949 | 1/2004 |

OTHER PUBLICATIONS

Shimizu et al., Multi-level Recording on Phase-change Optical Discs, Ricoh Technical Report No. 28, pp. 34-41, Dec. 2002.

* cited by examiner

*Primary Examiner*—Thang V. Tran
(74) *Attorney, Agent, or Firm*—Dickstein Shapiro LLP (57) ABSTRACT

An information recording method and an information recording apparatus are disclosed, wherein x-bit long binary data are converted into m multi-level data of n levels (x is an integer equal to or greater than 3, m is an integer equal to or greater than 2, and n is an integer equal to or greater than 3). The x-bit long binary data are treated as a word, where two or more words constitute a row of data sequence. Two or more rows of data sequence constitute an error correction block, each row having address information attached. The multi-level data, to which the error correction block is added, are recorded in an information recording medium.

16 Claims, 9 Drawing Sheets

| DATA NAME | NUMBER OF BYTES |
|---|---|
| IDENTIFICATION DATA (ID) | 1 |
| SECTOR ADDRESS | 4 |
| ADDRESS ECC | 4 |
| ADDITIONAL INFORMATION | 18 |
| USER DATA | 2048 |
| EDC | 4 |
| TOTAL | 2079 |

INFORMATION RECORDING METHOD AND AN INFORMATION RECORDING APPARATUS

BACKGROUND OF THE INVENTION

1. Field of the Invention

The present invention generally relates to an information recording method that records multi-level data in an information recording medium, such as an optical disk, and an information recording apparatus that records multi-level data in an information recording medium, such as an optical disk.

2. Description of the Related Art

According to a conventional method to improve error correction capability in the case of continuous data error (burst error) due to a crack, and the like on the optical disk (for example, Patent Reference 1), a data sequence in the direction of an inner code correction of a product code (i.e., a lateral data sequence, and often called a row) is made longer, an ECC block is divided into four product-code blocks, for example, and data are interleaved between blocks in the direction of the inner code correction such that the burst error is distributed.

Further, in order to increase the capacity of the optical disk, another conventional method (for example, Non-Patent Reference 1) raises recording density by performing multi-level recording (octal code recording) that records 0 through 7, instead of binary code recording that records 0 and 1, wherein 11-bit binary data are converted into four symbols of multi-level (8-level) data.

[Patent Reference 1] JPA, 2001-67813

[Non-Patent Reference 1]

Akihiko Shimizu, et al., "Multi-level Recording on Phase-change Optical Discs", Ricoh Technical Report No. 28, pp. 34-41.

[Problem(s) to be Solved by the Invention]

However, according to the conventional information recording method described above, 16 data frames are divided into four 172 B blocks, inner parity code (PI) and outer parity code (PO) are added to each block and complicated interleaving is performed, which requires a greater scale of circuit.

Further, two 2 KB of user data blocks, ID (address information), and RSV (reserve: reserved space for future expansion and storing information such as user information, producer information, and copyright protection) constitute a data frame.

According to the present DVD, RSV is added every 2 KB of user data. It is desirable that data (contents) recorded in the present DVD can be recorded in an optical disk of the next generation in the same way as at present.

Assuming that the next generation optical disk is capable of storing, e.g., three times as much data as present, contents, such as movie software and computer software, stored in three DVD disks now, for example, can be stored in one disk. At this future time, it is desirable that no reworking be required. Specifically, it is necessary that RSV data can be attached every 2 KB.

According to the conventional technology, there is a problem that the present contents data cannot be recorded as they are, i.e., without reworking.

Next, according to the latter conventional information recording method described above, wherein recording density is raised, a modulation method when recording multi-level data and a demodulation method when reproducing the multi-level data are disclosed; however, a data structure of error correction is not disclosed, which hinders realizing a practical optical disk system.

SUMMARY OF THE INVENTION

It is a general object of the present invention to provide an information recording method and an information recording apparatus that substantially obviate one or more of the problems caused by the limitations and disadvantages of the related art.

The present invention aims at providing suitable error correction when recording multi-level data to an information recording medium.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by an information recording method and an information recording apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides information recording methods (1) through (8) as follows.

(1) An information recording method to record multi-level data in an information recording medium, wherein the multi-level data have attached an error correction block, and the error correction block includes address information. Specifically, x-bit-long binary data (x is an integer, and x>=3) are converted into m symbols of multi-level data (m is an integer, and m>=2) of n levels ("n-level data") (n is an integer, and n>=3), the x bits serving as a word. Then, two or more words in the direction of recording and reproducing of the information recording medium are made into a row of data sequence. Then, two or more rows of data sequence serve as an error correction block, and address information is attached to each of the rows of data sequence.

(2) The information recording method as described at (1) above, wherein x is set to 11.

(3) The information recording method as described at (1) above, wherein additional data consisting of 6 or more bytes are added every 2 KB of user data in the error correction block.

(4) The information recording method as described at (1) above, wherein the address information of each of the rows of data sequence is a repetition number in a predetermined range.

(5) The information recording method as described at (4) above, wherein a number that is assigned in units of a predetermined number of rows is attached to each of the rows of data sequence.

(6) The information recording method as described at (4) above, wherein the same address information is provided to two or more places of each of the rows of data sequence.

(7) The information recording method as described at (4) above, wherein a CRC (Cyclic Redundancy Check) code generated based on the address information of each row is attached to the row of data sequence.

(8) The information recording methods (4) through (7), wherein a data pattern for distinguishing a top row of the predetermined number of rows is attached to each of the rows of data sequence.

The present invention further provides information recording apparatuses in (9) through (16) as follows.

(9) The information recording apparatus includes a unit to make an error correction block of two or more rows of data sequence, where each row of data sequence is constituted by two or more words, and each word is constituted by x-bit long binary data (x is an integer, and x>=3), a unit to add address information to each row of the error correction block, a unit to convert the x-bit long binary data into m n-level data symbols (m is an integer, and m>=2) (n is an integer, and n>=3), a unit to add the error correction block, to which the address information is added, to the n-level data converted as above, and to record this data in the information recording medium, a unit to reproduce the n-level data from the information recording medium, a unit to convert the reproduced n-level data into binary data in units of x bits, a unit to acquire the address information from the reproduced n-level data, and to acquire the error correction block based on the address information, and a unit to perform error correction on the binary data based on the error correction block.

(10) The information recording apparatus as described in (9) above, wherein x is set at 11.

(11) The information recording apparatus as described in (9) above, wherein 6 or more bytes are added to every 2 KB of the user data in the error correction block.

(12) The information recording apparatus as described in (9) above, wherein the address information of each of the rows of data sequence is a repetition number in the predetermined range.

(13) The information recording apparatus as described in (12) above, wherein a number that is assigned in units of a predetermined number of rows is attached to each of the rows of data sequence.

(14) The information recording apparatus as described in (12) above, wherein the same address information is provided in two or more places of each of the rows of data sequence.

(15) The information recording apparatus as described in (12) above, wherein a CRC (Cyclic Redundancy Check) code generated from the address information of each row is attached to each of the rows of data sequence.

(16) The information recording apparatus as described in (12) through (15) above, wherein a data pattern for distinguishing a top row of the predetermined number of rows is attached to each of the rows of data sequence.

[Effect of the Invention]

According to the information recording method and the information recording apparatus of the present invention, suitable error correction is provided when recording multi-level data to an information recording medium.

DESCRIPTION OF THE PREFERRED EMBODIMENTS

In the following, embodiments of the present invention are described with reference to the accompanying drawings.

Figure 1:
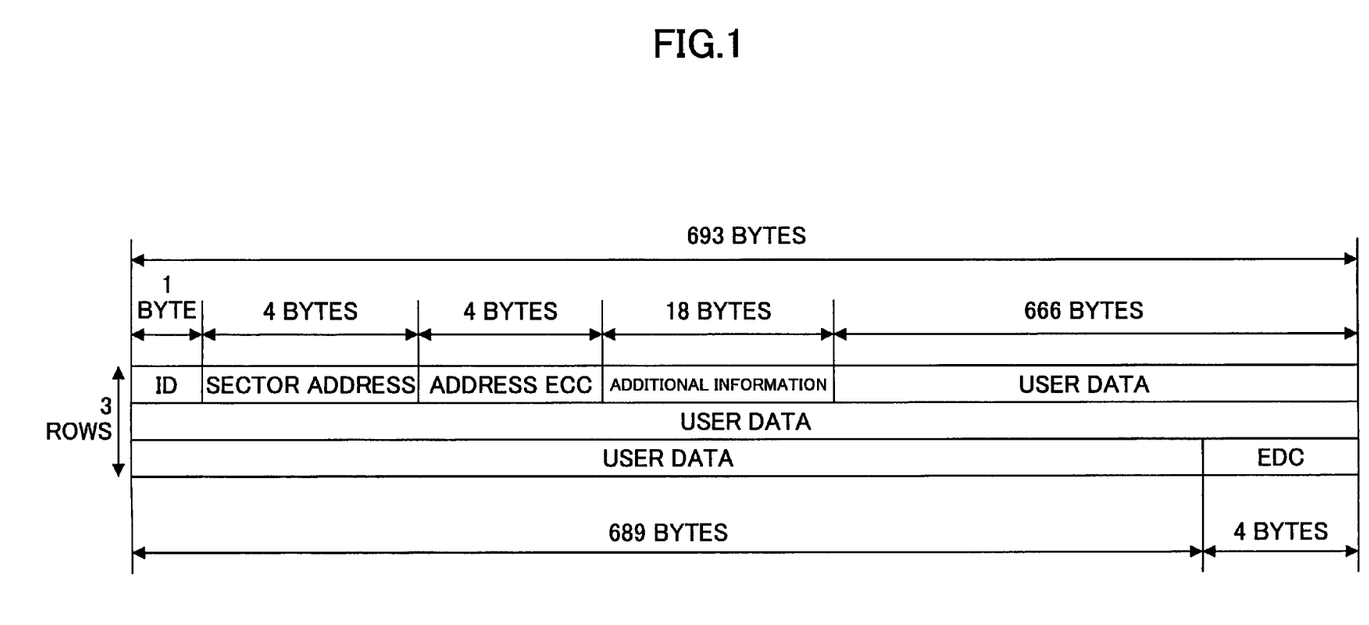
FIG. 1 shows the data structure of a sector containing 2 KB of user data, address information, etc.

FIG. 1 shows the data structure of a sector including 2 KB (=2048 bytes) of user data, address information, etc.

Figure 2:
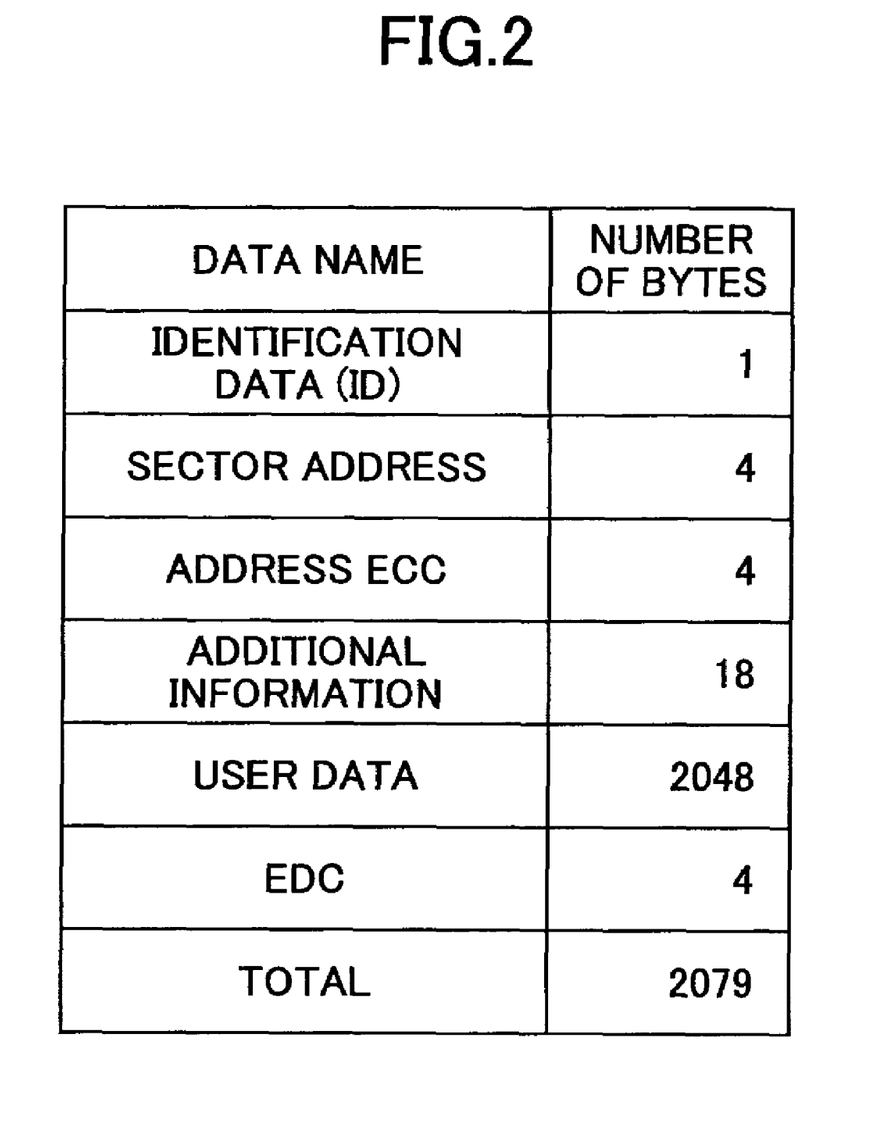
FIG. 2 shows kinds and byte counts of the data contained in the sector.

FIG. 2 shows kinds and byte counts of the data contained in the sector, wherein "ID" (Identification Data) stores information as to whether the disk is rewritable or read-only, whether data recording layer structure is single-layered or multi-layered, and the like.

"Sector address" stores address of the 2 KB user data on the disk.

"Address ECC" (Error Correction Code) is a 4-byte code for error correction associated with the sector address.

"Additional information" stores information additional to the user data, the additional information including provision for future expansion, user information, producer information, and copyrights protection.

"User data" occupy 2 KB, and store contents such as image data, voice data, and computer software.

"EDC" represents an error detection code that is for error detection, and is added to the ID, the sector address, the address ECC, the additional information, and the user data of a sector.

The total number of bytes of the above described items is 2079, and the bytes are called sector data in the present embodiment.

As shown in FIG. 1, the sector data consist of 3 rows×693 bytes. The number of bits in a row is 693 bytes×8 bits/byte=5544 bits. For 11-bit long words, this represents 504 words.

Since a row consists of words, each word consisting of 11-bit binary data, it is convenient to convert the row into multi-level data, specifically, into 4 octal symbols for multi-level recording in an optical disk.

Figure 3:
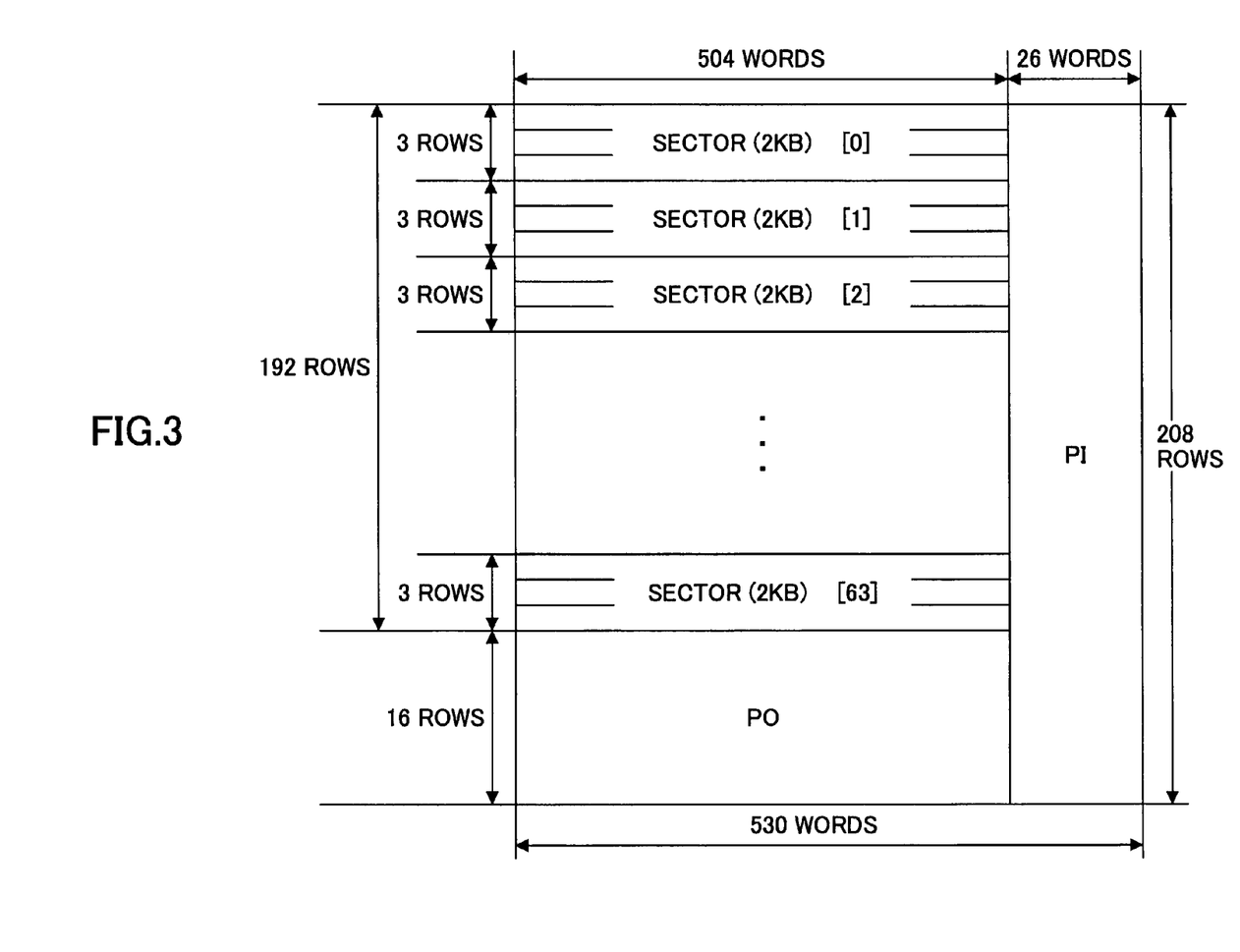
FIG. 3 shows the structure of data, wherein error correction data PO and PI are added to 64-sector data.

FIG. 3 shows the structure of data, wherein error correction data, namely, an outer parity code PO and an inner parity code PI, are added to 64-sector data.

Specifically, the outer parity code (PO) is added in the horizontal (width) direction of FIG. 3. The PO is generated using Reed Solomon code RS(208, 192, 17).

Although a Galois Field operation $GF(2^8)$, wherein 8 bits constitute a word, is usually used, the present embodiment employs $GF(2^{11})$, wherein 11 bits constitute a word. An example of a primitive polynomial for $GF(2^8)$ is $x^8+x^4+x^3+$ $x^2+1$ (Reference 1: Hiroshi Miyagawa et al., "Iwanami-Koza Information Science 4 (Vol. 17) Theory of information and code" Iwanami Shoten, Inc., Jan. 10, 1983, pp. 118-123 and Table 6.3 of p. 121).

In the case of using $GF(2^{11})$, a primitive polynomial $x^{11}+x^2+1$ may be used, for example.

Then, the inner code parity (PI) is added in the vertical (longitudinal) direction of FIG. 3. The PI is generated using Reed Solomon code RS(530, 504, 27).

$GF(2^{11})$ is also used here. If the number (n) of the data sequences in the direction of the inner code (PI) exceeds 256, the Galois Field operation $GF(2^8)$ becomes impossible. However, if $GF(2^{11})$ is used, the number of the data sequences in the direction of the inner code (PI) can be as great as 2048.

Figure 4:
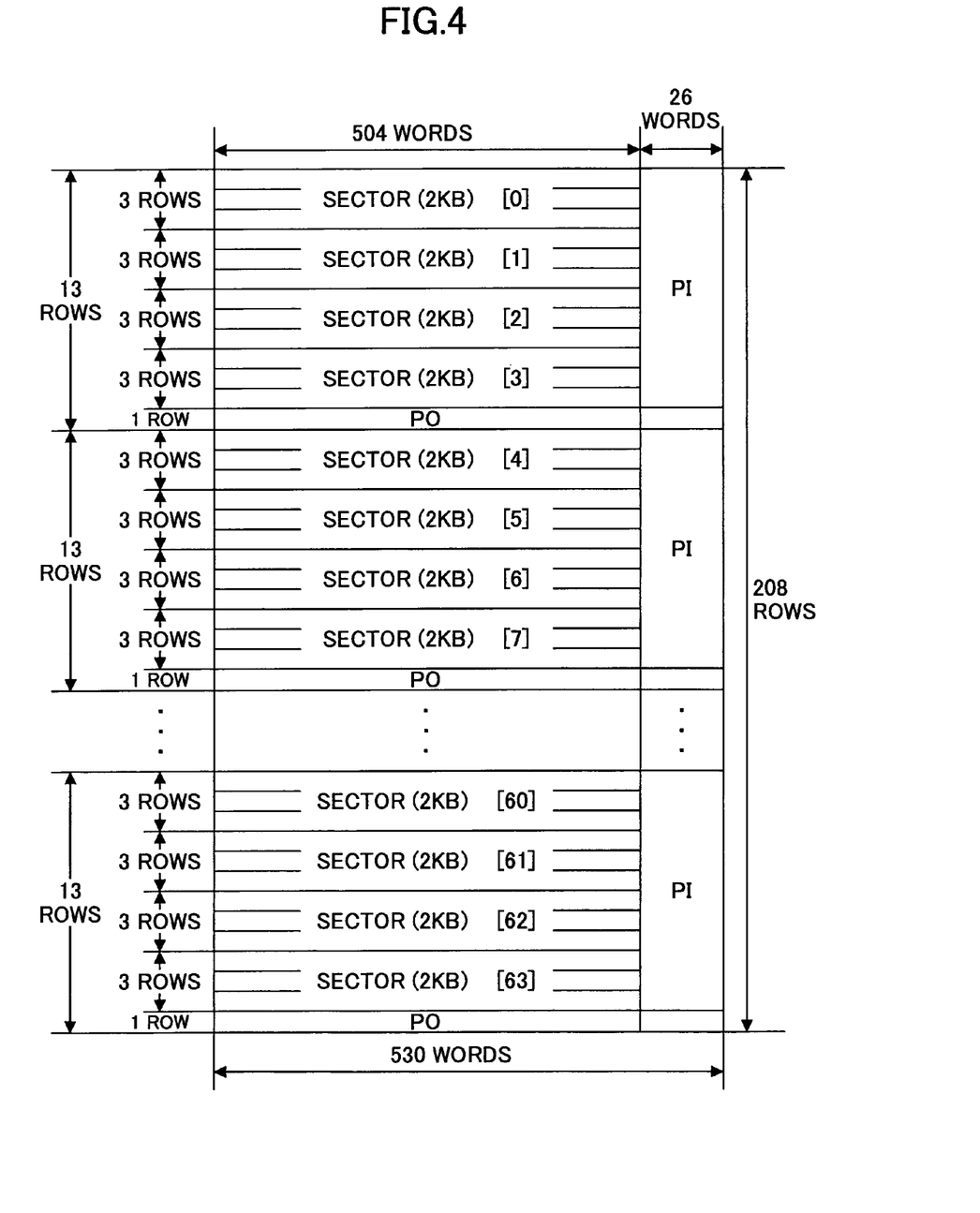
FIG. 4 shows the structure of the data, wherein PO is interleaved.

FIG. 4 shows a result of interleaving the rows of PO.

Specifically, a row of the PO (including the PI contained in respective rows) of 16 PO rows is inserted every four sectors (i.e., 12 rows).

In this way, a sector address is located in every third row or fourth row, and reading efficiency of the address when accessing data is improved.

Figure 5:
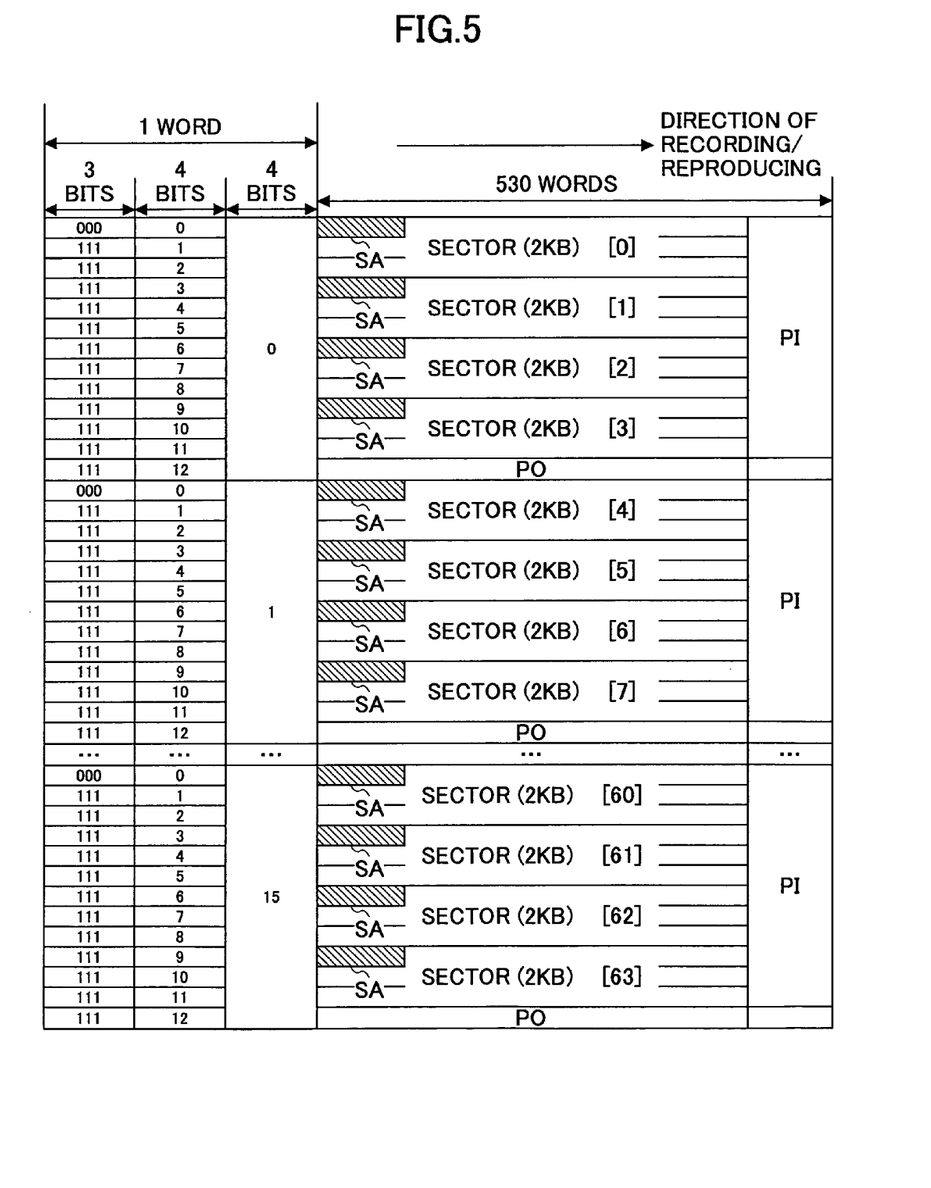
FIG. 5 shows the structure of the data after interleaving, wherein one-word long address information is added to each row of the data.

FIG. 5 shows the structure of the data after interleaving, wherein one-word long address information is added to each row of the data.

Data of 13 rows that consist of 4 sectors and a row of the PO are treated as a group. Numbers 0 through 12 (4 bits) are repeatedly assigned to each group, which numbers may be called repetition numbers. One of numbers 0 through 15 (4 bits) is uniquely assigned to each group (unique number). Data (3 bits), e.g., "000" are added to indicate the first row of each group, serving as MSBs in this example.

Recording and reproducing of data are carried out in the row direction, i.e., row by row, as shown in FIG. 5.

When accessing the data on the optical disk, it is necessary to read the sector address SA, and to detect a data block that constitutes a product code. If the three MSBs of the address information are "000", the sector address SA of the row is read such that which row it is in the data block that constitutes the product code can be determined. Or alternatively, the sector address SA is stored in a data row, the repetition number (0 through 12) of which is one of 0, 3, 6, and 9, the sector address SA of such a row is read, and which row it is in the data block that constitutes a product code can be determined.

Further, once a data block that constitutes the product code is detected by detecting a sector address SA, if subsequent data are sequentially read, data blocks that constitute product codes can be detected one by one by reading the unique number (0 through 15), dispensing with reading the sector address SA. Accordingly, high-speed access is attained.

In this manner, since the number of bits of a word of error correction is made to agree with the number of bits of binary data that are converted to multi-level data in multi-level recording, the method according to the present invention is suitable for multi-level recording. Further, since address information is added to each data sequence of the inner code correction in the product code of error correction (i.e., since address information is added to each row that constitutes an error correction block), a high-speed data search is possible.

Further, if a word of error correction is structured by 11 bits, the data sequence in the direction of inner code correction can be made longer, and the complicated interleaving in the direction of the inner code correction can be dispensed with.

In this manner, by structuring the error correction word with 11 bits, a row of the data sequence can be made longer, and the complicated interleaving can be dispensed with.

Furthermore, if additional information of 18 bytes is added for every 2 KB of user data as shown in FIG. 2, conventional contents data that require 6 bytes of additional information, and are recorded in an optical disk (for example, DVD) can be recorded by the information recording apparatus of the present invention as they are.

In this manner, conventional contents data recorded in an information recording medium, such as DVD, can be recorded by the information recording apparatus of the present invention as they are by adding 6 or more bytes of additional data for every user data sector of 2 KB.

Further, if the address information includes the repetition number (0 through 12) that identifies a row within a 13-row group, detection of a row that contains a sector address SA is facilitated, and a high-speed data search will be attained.

In this manner, if the repetition number in a predetermined range serves as the address information of each row, a high-speed data search is attained.

Further, if the address information is made to include the unique number (0-15) assigned to each 13-row group, data blocks that constitute product codes can be detected one by one without reading a sector address SA, once a data block that constitutes a product code is detected, and high-speed access to an information recording medium is attained.

In this manner, a high-speed data search is attained by adding a number unique to a group of a predetermined number of rows to each row.

Further, if a data pattern such as "000" for distinguishing the first row of every 13 rows is prepared at the high order (MSB) of the address information, the position of a row in a data block that constitutes a product code can be determined by reading the sector address SA of the row, and a high-speed data search is attained.

In this manner, a high-speed data search is easily attained by adding the data pattern for distinguishing the first row of a group constituted by a predetermined number of rows to each row.

Figure 6:
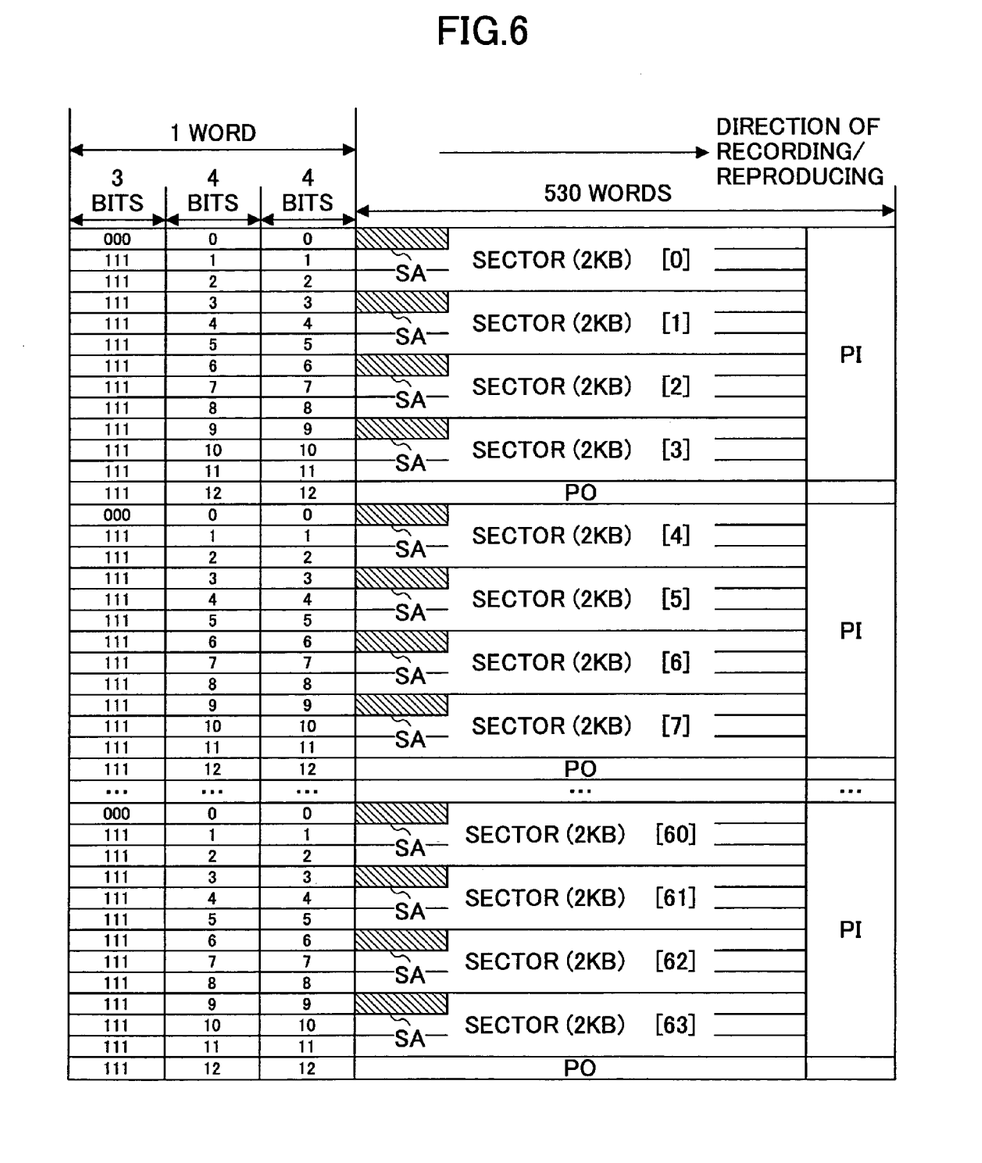
FIG. 6 shows the structure of the data after interleaving, wherein one-word long address information is added to each row of the data according to another embodiment.

FIG. 6 shows the structure of the data after interleave according to another embodiment, wherein one-word long address information is added to each row of the data. Recording and reproducing of the data of an information recording medium, such as an optical disk, is carried out one by one in the row direction as shown in FIG. 6.

Here, the repetition number of 0-12 that identifies each row within a 13-row group is recorded in duplicate in each row.

Only when the duplicated repetition numbers of a row are in agreement is the number used; and since an error may occur in the address information, when the numbers do not agree, a number is determined by interpolating from adjacent numbers.

By arranging as above, the probability of an error occurring when reading the address during data search can be reduced, and a high-speed and reliable data search is attained.

In this manner, a high-speed and reliable data search is attained by providing the same address in two or more places in each row as the address information.

Further, a Cyclic Redundancy Check (CRC) code for error detection may be recorded instead of duplicating the address information. CRC coding is a publicly known technology, wherein an operation of a predetermined generating polynomial is performed on information bits, and a redundancy bit (also called a "check bit") is generated; and the redundancy bit is added to the information bits such that a bit error can be detected (for example, Reference 2: "WHITE SERIES No. 33, Application examples of error correction coding technology <digital storage>", pp. 40-44, Triceps, Inc., July 14, Showa 61). According to the present embodiment, a 4-bit check bit is generated, and added to the repetition number that consists of 4 bits. In this case, a generating polynomial of, e.g., $x^4+x+1$ is used.

In this manner, an error in the address information of each row can be detected by providing the check bit, and a high-speed and reliable data search is attained.

As described above, a high-speed and reliable data search is attained by providing the CRC code generated from the address information of each row.

Further alternatively, a 4-bit CRC check code may be generated and added to 7-bit data that consist of the 3 highest bits (MSBs) of the address information and the 4-bit repetition number.

Further, if a data pattern such as "000" for distinguishing the first row of every 13 rows is prepared at the high order of the address information as shown in FIG. 6, a position of a row in a data block that constitutes a product code can be determined by reading the sector address SA of the row, and a high-speed data search is attained.

In this manner, a high-speed data search is easily attained by adding the data pattern for distinguishing the first row of a group constituted by a predetermined number of rows to each row.

Figure 7:
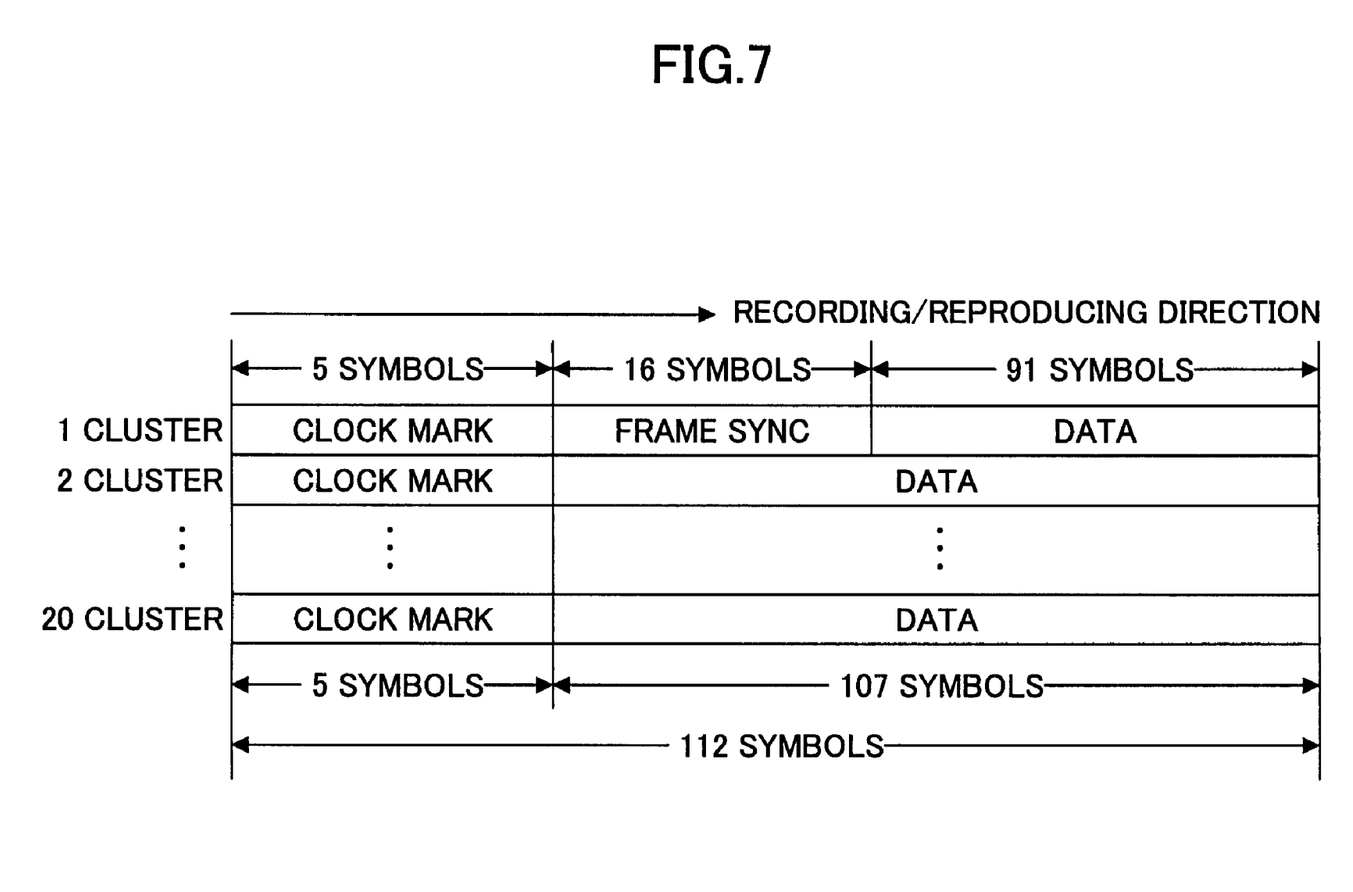
FIG. 7 shows an example of the structure of data to be recorded in an optical disk serving as the information recording medium, the data being of a data block that constitutes a product code to which address information is added, and the data being converted to multi-level data.

FIG. 7 shows an example of the structure of data to be recorded in an optical disk serving as an information recording medium, the data being of a data block. (531 words×208 rows) that constitutes a product code to which the address information is added, and the data being converted to multi-level data.

For example, 11-bit binary data are converted into four symbols of octal data each symbol taking a value between 0 and 7, and recorded. A clock mark and a frame sync as follows are inserted into the multi-level data, and recorded. A digit of multi-level data is called a symbol.

Clock mark="00700"
Frame sync="00000777777770000": Table frame
"00000777777770077": Data frame The data frame of the frame sync is inserted into the data block that constitutes the product code, to which the address information is added. The table frame is inserted when recording table data that consist of 514 symbols for multi-level data detection.

Each of the 531 11-bit long words of binary data is converted into four symbols of octal data (8-level data). The multi-level data (octal data) after conversion consist of 531 words×4 symbols/word=2124 symbols, to which the data frame (multi-level data of 16 symbols) of the frame sync is inserted. The number of symbols of all the multi-level data is 2124+16=2140, into which the clock mark (multi-level data of five symbols) is inserted every 107 symbols. Accordingly, the data structure becomes as shown in FIG. 7.

This is called a frame. Since the frame contains user data, the frame is also called a data frame.

The data block that constitutes the product code, to which the address information is added, serves as a data block for 208 frames. Further, as for the table frame containing the table data, frame sync is replaced with the data pattern of the table frame, and the multi-level data of 2124 symbols are replaced with a repetition of the table data that consist of 514 symbols.

In a frame, data of a row of 112 symbols that begin from the clock mark are called a cluster. Recording and reproducing of the data of the information recording medium, such as an optical disk, are carried out one by one in the width direction (horizontally) as shown in FIG. 7.

Accordingly, when the multi-level data are recorded on an optical disk, the length of a frame on the optical disk is 0.24 μm×112 symbols×20 clusters=0.54 mm, assuming that the record length of a symbol of the multi-level data is set at 0.24 μm.

The length of 0.54 mm is equivalent to the length of a row of the data block that constitutes the product code, to which the address information is added. Since the outer code parity (PO) occupies 16 rows, error correction for 16 rows is possible by a publicly known technology, "erasure correction". In other words, the longest burst error that can be corrected is 0.54 mm×16 rows=8.64 mm.

In the case where the optical disk is a DVD disk, the longest burst error that can be corrected is 6 mm. Thus the correction capability of the present embodiment is better than the DVD in the case of a burst error.

Figure 8:
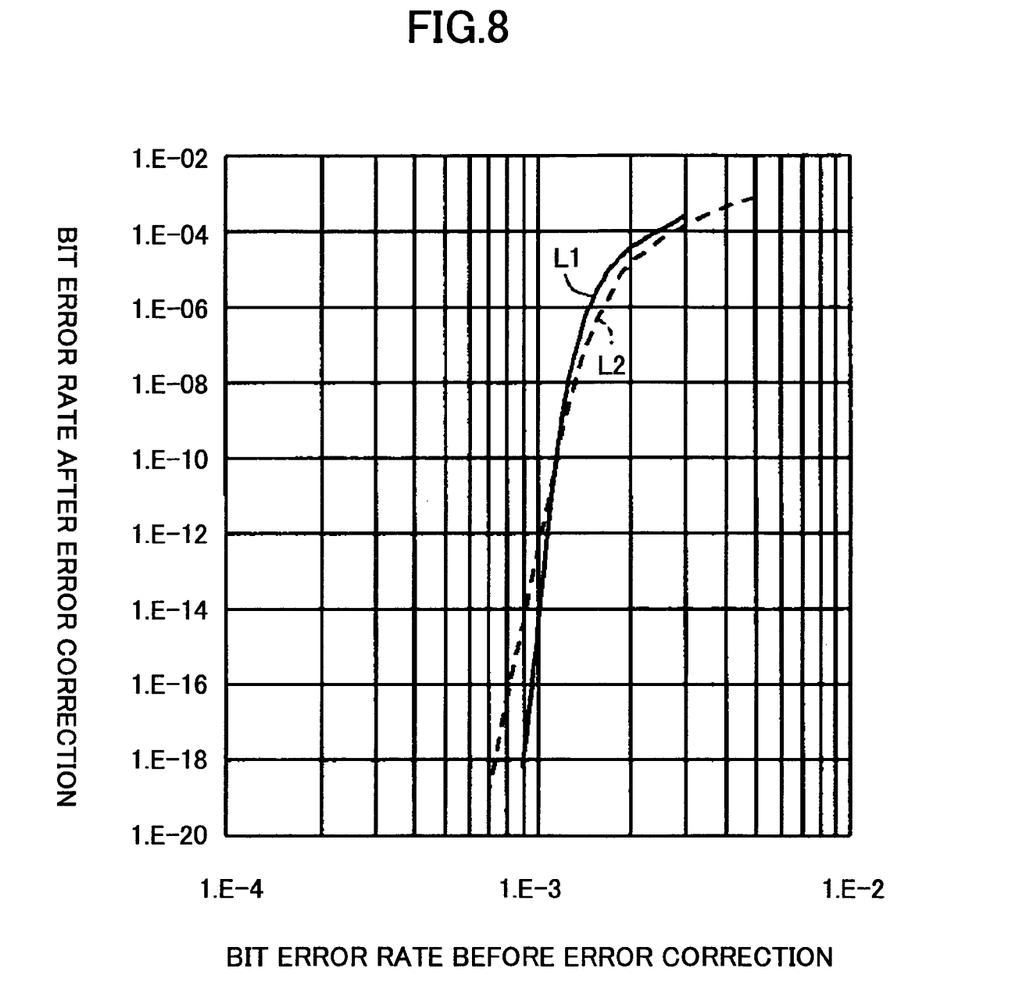
FIG. 8 is a graph comparing correction capability of DVD with an embodiment of the present invention as represented by a theoretical calculation under the condition that errors occur at random.

FIG. 8 is a graph comparing correction capability of the conventional DVD with the embodiment of the present invention as represented by a theoretical calculation under the condition that errors occur at random.

The horizontal axis in FIG. 8 represents the bit error rate before correction, and the vertical axis represents the bit error rate after correction. A curve L1 in FIG. 8 represents the case of the DVD, wherein PI corrects an error of 5 bytes or less, and subsequently, PO corrects an error of 8 bytes or less.

A curve L2 in FIG. 8 represents the bit error rate according to the information recording method of the embodiment, wherein PI corrects an error of 13 words or less, and subsequently PO corrects an error of 8 words or less. FIG. 8 indicates that both demonstrate about the same correction capability in the case of an error generated at random.

Although the present embodiment is described about the case wherein the error correction block is served by the structure of the data block with the product code, the information recording method of the present invention is not limited to this, but also is applicable to an error correction block of a different structure.

Figure 9:
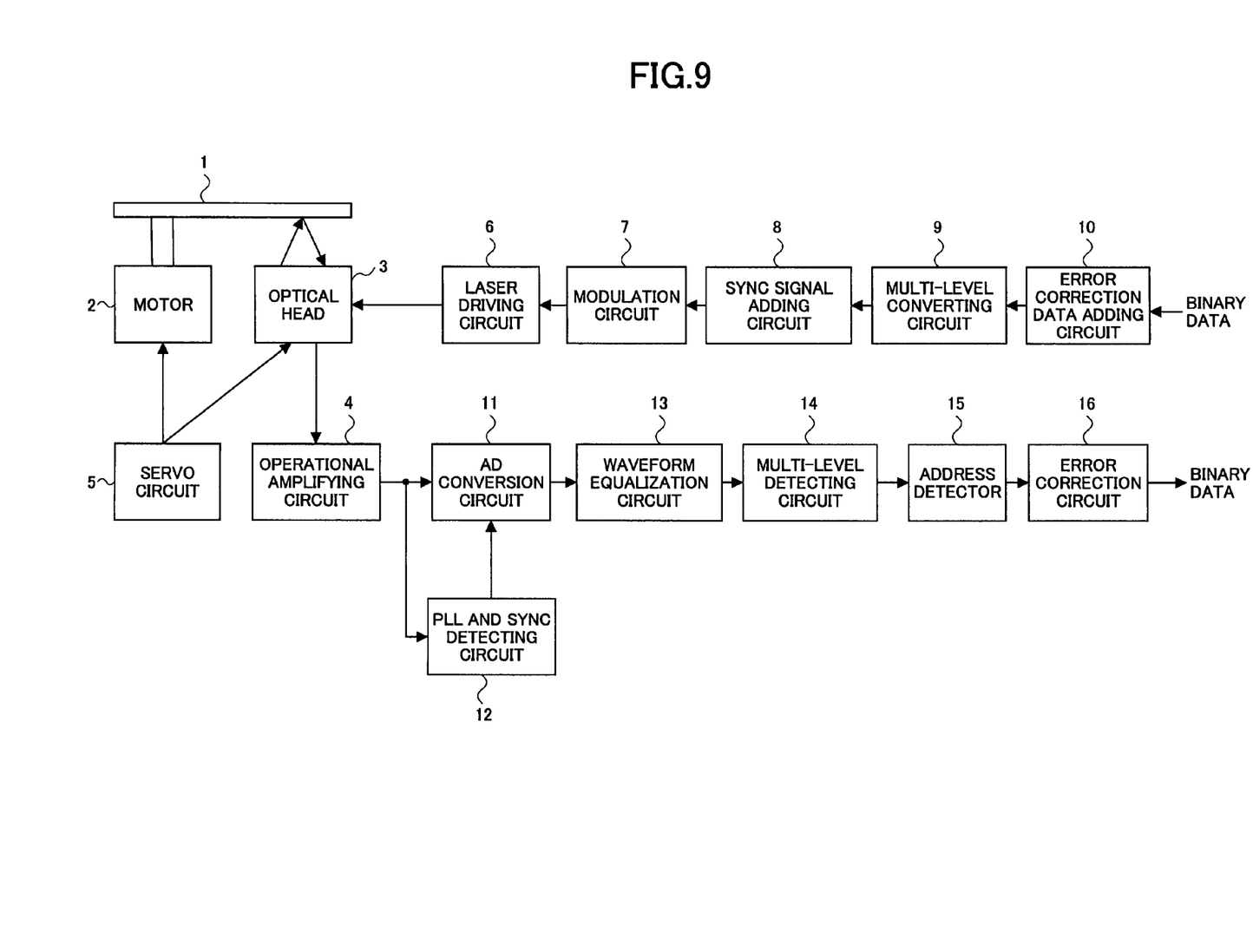
FIG. 9 is a block diagram of an optical disk apparatus, which is an embodiment of the information recording apparatus of the present invention, to which the information recording method of the present invention is applied.

FIG. 9 is a block diagram of an optical disk apparatus, which is an embodiment of the information recording apparatus of the present invention, to which the information recording method of the present invention as described above is applied.

With reference to FIG. 9, an optical disk 1 is an information recording medium that records information, providing a track that is spiral or in the shape of concentric circles, wherein marks are recorded along the track. The track slightly wobbles (goes zigzag) at a fixed cycle.

A motor 2 rotates an optical disk 1.

An optical head 3 irradiates a laser beam spot onto the optical disk 1 such that marks are recorded in the optical disk 1, and the recorded marks are scanned to obtain an electrical signal.

An operation amplifying circuit 4 carries out operational amplification of the electrical signal output from the optical head 3, and outputs signals such as a reproduction signal corresponding to the marks on the optical disk 1, a focal error signal that indicates whether the laser beam spot is properly focused on the recording layer of the optical disk 1, a tracking error signal that indicates whether the laser beam spot is properly scanning along the track, a wobbling signal corresponding to the wobble of the track, etc.

A servo circuit 5 controls such that the laser beam spot is properly focused on the recording layer of the optical disk 1, the track is properly scanned, and the optical disk 1 is properly rotated at a constant linear velocity or a constant angular velocity based on the focal error signal, the tracking error signal, and the wobbling signal, respectively.

A laser drive circuit 6 outputs a signal for recording marks in the optical disk 1 according to a signal output from a modulation circuit 7.

The modulation circuit 7 outputs the signal that consists of marks and spaces (multi-level data value=0, i.e., no mark is recorded), the length of the marks corresponding to the value of input multi-level data.

A sync signal adding circuit 8 inserts a clock mark and a frame sync as shown in FIG. 7.

A multi-level converting circuit 9 converts binary data (11 bits), which are input, into multi-level data (octal data of four symbols).

An error correction data adding circuit 10 adds error correction data to input binary data. That is, data processing shown by FIGS. 1 through 5 is performed.

An AD conversion circuit 11 converts the reproduced signal provided by the operation amplifying circuit 4 into a digital signal.

A PLL (Phase Locked Loop) and sync detecting circuit 12 detects the sync signal (a frame sync and a clock mark) in the reproduced signal, and output a clock signal that is in sync with the multi-level data.

A waveform equalization circuit 13 performs waveform equalization.

A multi-level detecting circuit 14 converts input multi-level data into binary data.

An address detector 15 reads a sector address SA from the address information, and detects the data block that constitutes a product code.

An error correction circuit 16 performs error correction using the error correction data.

In addition, although illustration is omitted, a mechanism to move the optical head 3 in the radius direction of the optical disk 1 such that data are searched for in the optical disk 1 is also provided. Further, illustration of an interface circuit, information storage a computer, a microprocessor that controls the operations of the entire optical disk apparatus, and the like is omitted.

As the optical disk 1, a DVD+RW disk may be used. For the optical head 3, a laser diode, wavelength of a laser beam of which is 650 nm may be used. Further, a blue laser that provides higher density recording, having a laser wavelength of, e.g., 405 nm, and a phase-change type optical disk corresponding to the blue laser may be used.

Next, operations of the optical disk apparatus shown in FIG. 9 are described.

First, writing operations are described, wherein binary data are converted into multi-level data for recording in the optical disk 1.

The binary data are treated in units of 2 KB of user data, to which disk identifying data, sector-address data, address ECC data, additional information data, and EDC data are added as shown in FIG. 2. The sector data are input to a memory (that is a memory provided in the error correction data adding circuit, illustration of which is omitted), wherein a word is 11 bits long.

Then, as shown in FIG. 3, data of 64 sectors are stored in the memory. Then, PO and PI data are generated by operations of the Reed Solomon code, and the PO and PI data are stored in the memory.

An interleaving process is carried out by outputting a row of PO data every 4 sectors, with results as shown in FIG. 4.

Then, a word of address information is added to the head of each row as shown in FIG. 5.

The data as shown in FIG. 5 are output from the error correction data addition circuit 10.

Subsequently, the binary data in units of 11 bits are converted into octal data of four symbols by the multi-level converting circuit 9. Next, the sync signal adding circuit 8 inserts a clock mark and a frame sync as shown in FIG. 7. Next, the modulation circuit 7 generates a signal that drives a laser beam for recording marks corresponding to each value of the multi-level data on the optical disk 1. Then, the optical head 3 by control of the laser drive circuit 6 irradiates the laser beam onto the optical disk 1, and the marks are recorded in the optical disk 1.

Next, reading operations are described, wherein a multi-level signal is read from the optical disk 1, and converted into binary data.

The optical head 3 irradiates a laser beam of fixed intensity onto the optical disk 1, optoelectronic conversion of the reflected light is carried out, and an electrical signal is obtained. The acquired electrical signal is provided to the operation amplifying circuit 4, the servo circuit 5 stably rotates the optical disk 1, tracking and focal control of the optical head 3 are performed, and a multi-level signal is reproduced. The PLL and synchronous detector 12 detect the frame sync and the clock mark from the reproduced multi-level signal, and the clock in sync with the multi-level data is generated by the PLL. The AD translation circuit 11 generates digital data of the multi-level data using the generated clock. Then, the waveform equalization circuit 13 equalizes the waveform, the multi-level determining circuit 14 converts the multi-level data into binary data, wherein 11 bits constitute a word, and the binary data are output.

Each row of the data of the data block shown in FIG. 5 is provided to the address detector 15 using the frame sync detected by the PLL and synchronous detector 12.

The address detector 15 first reads the address information provided at the head of the row. When the address information indicates that the row contains a sector address SA, the sector address SA is read. At this time, error detection and error correction are performed using the address ECC data.

The data block that constitutes a product code is detected using the sector address SA, and output.

The error correction circuit 16 stores the data of the data block that constitutes the product code in the memory of the error correction circuit 16 (illustration is omitted), wherein a word is 11 bits long. At this time, the address information of the head of the row is not stored in the memory, but rather only 530 words thereafter are stored. Furthermore, since there is a row that contains PO data every 13 rows, in order to remove the interleaving, the address is switched so that the data structure is put back to as shown in FIG. 3, and the data are stored in the memory. Then, detection and correction of an error are performed using the PO and PI data, and binary data after correction are output.

According to the optical disk apparatus of the embodiment, a word of error correction is constituted by the same number of bits as the binary data when converting the binary data into the multi-level data, which is suitable for multi-level recording. Further, the address information is added to each data sequence of the inner code correction of the product code of error correction, and when reproducing, the address detector 15 reads the address information, reads the sector address SA, and the data block that constitutes the product code is detected; for this reason, a high-speed data search is attained. In this manner, a high-speed data search is attained by adding the address information to each row of an error correction block.

Further, if a word of error correction is constituted by 11 bits, the data sequence in the inner code correction direction can be elongated, and an optical disk apparatus that dispenses with the complicated interleaving of the inner code correction direction can be realized.

In this manner, by constituting a word by 11 bits, the data sequence of a row can be made longer, and the complicated interleaving becomes unnecessary.

Furthermore, if 18 bytes of additional information are added to each set of 2 KB user data as shown in FIG. 2, conventional contents data that are recorded on a DVD disk, and that require 6 bytes of additional information can be recorded by the optical disk apparatus of the present invention as they are.

In this manner, the conventional contents data that are recorded in the DVD disk can be recorded as they are by adding 6 bytes or more of additional data every 2 KB of the user data.

Further, by adding the 1-word address information as shown in FIG. 5, the repetition number (0 through 12) that identifies each row within a group of the 13-row data is included. For this reason, detection of a row in which a sector address SA is contained by the address detector 15 is facilitated, and a high-speed data search is attained.

In this manner, a high-speed data search is attained by including the address information of each row into the repetition number in the predetermined range, such as 0 through 12.

Furthermore, since the address information includes a unique number (0-15) for each group of 13 rows, once the address detector 15 detects the data block that constitutes the product code, data blocks that constitute product codes can be sequentially detected without reading the sector address SA. Accordingly, high-speed access is attained.

In this manner, a high-speed data search is attained by adding a unique number to each group consisting of a predetermined number of rows.

Further, by providing a 3-bit data pattern, such as "000", at the high order of the address information for identifying the top row of every 13 rows, the address detector 15 can easily determine a sequential position of a row in the data block that constitutes the product code by reading the sector address SA based on the 3-bit data pattern. Accordingly, a high-speed data search is attained.

In this manner, a high-speed data search is easily attained by adding the data pattern for distinguishing the top row of a group consisting of the predetermined number of rows.

Although the embodiment employs the data structure shown in FIG. 5, the present invention is not limited to this. For example, the data structure as shown in FIG. 6 may be used. In this case, the repetition number (0 through 12) that identifies each row within a group of 13 rows is recorded in duplicate. Accordingly, only when the address detector 15 determines that the two repetition numbers are in agreement, is the number used; otherwise, a number is obtained by interpolating adjacent numbers.

By carrying out as described above, the probability of an error in reading the address when searching for data can be reduced, and a high-speed reliable data search is attained.

In this manner, a high-speed reliable data search is attained by providing the same address of a row in two or more places.

Further, a CRC code circuit may be additionally provided to the error correction data adding circuit 10 such that a check bit is added to the address information of each row of the error correction block.

In this case, for reproducing data, a CRC detecting circuit is added to the address detector 15 such that an error is detected when detecting the address information of each row.

The arrangement as described above further reduces the probability of an error in the address when searching for data, and thereby a high-speed reliable data search is attained.

In this manner, a higher-speed and more reliable data search is attained by adding the CRC code generated based on the address information of each row.

According to the information recording method and the optical disk apparatus of the embodiment, the address information is added to each row that constitutes an error correction block, which realizes the high-speed data search.

Further, since the data sequence of a row is made longer by structuring a word of 11 bits, the complicated interleaving can be dispensed with.

Furthermore, conventional contents data that are recorded on a DVD disk can be recorded as they are by adding 6 bytes or more of additional data for every 2 KB of user data. Further, a high-speed data search is attained by the address information of each row served by the repetition number in a predetermined range.

Furthermore, a high-speed data search is attained by adding a number within a predetermined number of rows to each row.

Further, a high-speed reliable data search is attained by providing the same address to two or more places as the address information of each row.

Furthermore, a higher-speed and more reliable data search is attained by adding a CRC code generated based on the address information of each row.

Furthermore, a high-speed data search is easily attained by adding a data pattern for distinguishing the top row of a group consisting of a predetermined number of rows.

[Availability to Industry]

The information recording method and the information recording apparatus according to the present invention are applicable to personal computers, such as a desktop personal computer and a notebook personal computer.

Further, the present invention is not limited to these embodiments, but variations and modifications may be made without departing from the scope of the present invention.

The present application is based on Japanese Priority Application No. 2004-074107 filed on Mar. 16, 2004 with the Japanese Patent Office, the entire contents of which are hereby incorporated by reference.

What is claimed is:

1. An information recording method configured for recording in an information recording medium, comprising:
   a step of converting a word of binary data into m pieces of n-level data, wherein the word consists of x bits, x is an integer that is equal to or greater than 3, m is an integer equal to or greater than 2, and n is an integer equal to or greater than 3;
   a step of arranging plural of the words into a row of data sequence, the words being in a recording and reproducing direction of the information recording medium;
   a step of arranging plural of the rows of data sequence into an error correction block;
   a step of adding address information to each of the rows of data sequence; and a step of adding the error correction block, to which the address information is added, to the n-level data.

2. The information recording method as claimed in claim 1, wherein said x is set at 11.

3. The information recording method as claimed in claim 1, wherein additional data consisting of 6 bytes or more are added to each set of user data that consists of 2 KB in the error correction block.

4. The information recording method as claimed in claim 1, wherein the address information of each of the rows of data sequence is a repetition number in a predetermined range.

5. The information recording method as claimed in claim 4, wherein a number unique to a group of a predetermined number of rows is added to each of the rows of data sequence.

6. The information recording method as claimed in claim 4, wherein the same address information is provided in two or more locations as address information of each of the rows of data sequence.

7. The information recording method as claimed in claim 4, wherein a cyclic redundancy check code generated based on the address information of each of the rows of data sequence is added to the row.

8. The information recording method as claimed in claim 4, wherein a data pattern is added to each of the rows of data sequence such that a top row of a group of the predetermined number of rows is distinguished.

9. An information recording apparatus, comprising:
an error correction block generating unit configured to generate an error correction block constituted by a plurality of rows of data sequence, each row consisting of a plurality of words, and each word consisting of x bits of binary data representing a given value, where x is an integer that is equal to or greater than 3;
an address information adding unit configured to add address information to each of the rows of the error correction block;
a converting unit configured to convert each word into m pieces of n-level data where m is an integer equal to or greater than 2, and n is an integer equal to or greater than 3;
a recording unit configured to add the error correction block, to which the address information is added, to the n-level data as converted by the converting unit, and to record the n-level data in an information recording medium;
a reproducing unit configured to reproduce the n-level data from the information recording medium;
a second converting unit configured to convert the n-level data reproduced by the reproducing unit into binary data structured by units of 11 bits;
an error correction block detecting unit configured to detect an error correction block using the address information that is obtained from the reproduced n-level data; and
an error correcting unit configured to perform error correction on the binary data based on the error correction block detected by the error correction block detecting unit, the binary data being obtained by the second converting unit.

10. The information recording apparatus as claimed in claim 9, wherein said x is set at 11.

11. The information recording apparatus as claimed in claim 9, wherein additional data consisting of 6 bytes or more are added to each set of user data that consists of 2 KB in the error correction block.

12. The information recording apparatus as claimed in claim 9, wherein the address information of each of the rows of data sequence is a repetition number in a predetermined range.

13. The information recording apparatus as claimed in claim 12, wherein a number unique to a group of a predetermined number of rows is added to each of the rows of data sequence.

14. The information recording apparatus as claimed in claim 12, wherein the same address information is provided in two or more locations as address information of each of the rows of data sequence.

15. The information recording apparatus as claimed in claim 12, wherein a cyclic redundancy check code generated based on the address information of each of the rows of data sequence is added to the row.

16. An information recording apparatus given in the claim 12, wherein a data pattern is added to each of the rows of data sequence such that a top row of a group of the predetermined number of rows is distinguished.

* * * * *